(12) United States Patent
Nagata et al.

(10) Patent No.: US 8,548,512 B2
(45) Date of Patent: Oct. 1, 2013

(54) METHOD FOR REPORTING CHANNEL QUALITY INFORMATION VIA UPLINK, AND BASE STATION AND USER DEVICE ADAPTED FOR THE METHOD

(75) Inventors: Satoshi Nagata, Yokosuka (JP); Hidekazu Taoka, Tokyo (JP); Yoshihisa Kishiyama, Yokosuka (JP); Kenichi Higuchi, Saitama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 212 days.

(21) Appl. No.: 12/746,702

(22) PCT Filed: Dec. 26, 2008

(86) PCT No.: PCT/JP2008/073709
§ 371 (c)(1),
(2), (4) Date: Sep. 14, 2010

(87) PCT Pub. No.: WO2009/087924
PCT Pub. Date: Jul. 16, 2009

(65) Prior Publication Data
US 2011/0009139 A1    Jan. 13, 2011

(30) Foreign Application Priority Data
Jan. 8, 2008    (JP) .................................. 2008-001666

(51) Int. Cl.
*H04B 15/00*    (2006.01)
(52) U.S. Cl.
USPC .................. 455/509; 455/507; 455/226.1

(58) Field of Classification Search
USPC .............. 455/179.1, 226.1–4, 507, 509, 63.1; 370/252, 328
See application file for complete search history.

(56) References Cited

U.S. PATENT DOCUMENTS

| 8,000,258 B2 * | 8/2011 | Ko et al. ........................ 370/252 |
| 8,229,448 B2 * | 7/2012 | Khan ........................... 455/452.2 |
| 2006/0209669 A1 * | 9/2006 | Nishio ........................... 370/208 |

(Continued)

FOREIGN PATENT DOCUMENTS

| JP | 2003-513534 A | 4/2003 |
| JP | 2007-166118 A | 6/2007 |

(Continued)

OTHER PUBLICATIONS

Patent Abstracts of Japan, Publication No. 2007-166118, dated Jun. 28, 2007, 1 page.

(Continued)

*Primary Examiner* — Ping Hsieh
*Assistant Examiner* — Chung-Tien Yang
(74) *Attorney, Agent, or Firm* — Osha Liang LLP

(57) ABSTRACT

A base station for a mobile communication system includes a speed detecting unit configured to detect the moving speed of a user device based on a signal received from the user device and indicating the moving speed; and a determining unit configured to select, based on the moving speed detected by the speed detecting unit, a wideband channel quality indicator indicating reception quality of an entire system frequency band allocated to the mobile communication system, or a combination of the wideband channel quality indicator and one or more channel quality indicators of subbands in the system frequency band as channel quality information that needs to be reported from the user device to the base station.

23 Claims, 9 Drawing Sheets

(56) References Cited

U.S. PATENT DOCUMENTS

| | | | |
|---|---|---|---|
| 2009/0170437 A1* | 7/2009 | Bhattad et al. | 455/63.1 |
| 2010/0110982 A1* | 5/2010 | Roh et al. | 370/328 |
| 2011/0009139 A1* | 1/2011 | Nagata et al. | 455/509 |

FOREIGN PATENT DOCUMENTS

| | | |
|---|---|---|
| JP | 2007-251498 A | 9/2007 |
| WO | 01/31950 A1 | 5/2001 |
| WO | 2005/020488 A1 | 3/2005 |

OTHER PUBLICATIONS

Patent Abstracts of Japan, Publication No. 2007-251498, dated Sep. 27, 2007, 1 page.

3GPP TSG RAN WG1 Meeting #51, R1-075069, "Summary of AH session on AI 6.4.5, "UE Procedures for downlink shared channel"," Jeju, Korea, Nov. 5-9, 2007, 7 pages.

International Search Report issued in PCT/JP2008/073709, mailed on Feb. 10, 2009, with translation, 9 pages.

Written Opinion issued in PCT/JP2008/073709, mailed on Feb. 10, 2009, 3 pages.

Office Action for Japanese Patent Application No. 2009-548890 mailed Oct. 23, 2012, with English translation thereof (5 pages).

3GPP TSG-RAN-WG2 Meeting #50, Tdoc R2-061255, "Frequency Selective Scheduling and CQI reporting"; Motorola, Shanghai, China, Mar. 27-31, 2006 (4 pages).

3GPP TSG-RAN WG1 #51, R1-075064, "Proposal for Refinements on Frequency-Selective CQI for Single Tx and TxD"; Ericsson, Nokia, Nokia Siemens Network, Texas Instruments, Huawei, AT&T, NTT DoCoMo, Fujitsu, LG, Sharp, Panasonic, Mitsubishi, Qualcomm, Motorola, Freescale Semiconductor Inc, Samsung, NEC; Jeju, Korea, Nov. 5-9, 2007 (4 pages).

3GPP TSG RAN WG1 Meeting #50, R1-073322, "UL physical channel for CQI report"; Sharp, Athens, Greece, Aug. 20-24, 2007 (3 pages).

* cited by examiner

METHOD FOR REPORTING CHANNEL QUALITY INFORMATION VIA UPLINK, AND BASE STATION AND USER DEVICE ADAPTED FOR THE METHOD

TECHNICAL FIELD

The present invention relates to a method for reporting channel quality information via uplink, and a base station and a user device adapted for the method.

BACKGROUND ART

Methods for reporting channel quality information (channel quality indicator: CQI) from a user device to a base station are being discussed by the $3^{rd}$ Generation Partnership Project (3GPP), a standardization group. For example, this subject was discussed in 3GPP TSG RAN WG1 Meeting #51 (R1-075069, Nov. 5-9, 2007).

Channel quality indicators are reported regularly (regular reporting) and irregularly (irregular reporting). In regular reporting, the user device reports CQIs at regular intervals using a physical uplink control channel (PUCCH) or a physical uplink shared channel (PUSCH). In irregular reporting, the user device reports CQIs using the PUSCH in response to a request from the base station.

Meanwhile, there are several types of CQIs with respect to frequency bands: a wideband CQI indicating channel quality of the entire system frequency band and subband CQIs (frequency selective CQIs) indicating channel quality of the corresponding subbands in the system frequency band. The user device may report (A) only a wideband CQI, (B) a wideband CQI and subband CQIs selected by the user device, or (C) a wideband CQI and subband CQIs specified (or selected) by the base station.

DISCLOSURE OF INVENTION

Problems to be Solved by the Invention

As described above, methods for reporting CQIs are being discussed by 3GPP. However, how to select and combine the above methods have not been discussed yet.

One object of the present invention is to provide a method for determining a CQI reporting mode for reporting channel quality indicators from a user device to a base station, and the user device and the base station adapted for the method.

Means for Solving the Problems

A first aspect of the present invention provides a base station for a mobile communication system. The base station includes a detecting unit configured to detect predetermined information regarding a user device; and a determining unit configured to determine types of channel quality information that need to be reported from the user device to the base station based on the detected information.

According to a second aspect of the present invention, in the base station of the first aspect, the detecting unit is configured to detect a moving speed of the user device based on a signal received from the user device and indicating the moving speed; and the determining unit is configured to select, based on the moving speed, a wideband channel quality indicator indicating reception quality of an entire system frequency band allocated to the mobile communication system, or a combination of the wideband channel quality indicator and one or more channel quality indicators of subbands in the system frequency band as the channel quality information that needs to be reported from the user device to the base station.

According to a third aspect of the present invention, in the base station of the first aspect, when a combination of a wideband channel quality indicator indicating reception quality of an entire system frequency band allocated to the mobile communication system and one or more channel quality indicators of subbands in the system frequency band is currently selected as the channel quality information that needs to be reported from the user device to the base station, the detecting unit is configured to detect a number of user devices in a cell or a sector formed by the base station; and the determining unit is configured to select, based on a first reference value for the number of user devices, a first combination of the wideband channel quality indicator and highest M channel quality indicators selected by the user device from the channel quality indicators of the subbands or an average of the M channel quality indicators, or a second combination of the wideband channel quality indicator and channel quality indicators selected by the base station from the channel quality indicators of the subbands as the channel quality information that needs to be reported from the user device to the base station.

According to a fourth aspect of the present invention, in the base station of the first aspect, when a combination of a wideband channel quality indicator indicating reception quality of an entire system frequency band allocated to the mobile communication system and one or more channel quality indicators of subbands in the system frequency band is currently selected as the channel quality information that needs to be reported from the user device to the base station, the detecting unit is configured to extract the wideband channel quality indicator from a signal received from the user device; and the determining unit is configured to select, based on a first reference value for the extracted wideband channel quality indicator, a first combination of the wideband channel quality indicator and highest M channel quality indicators selected by the user device from the channel quality indicators of the subbands or an average of the M channel quality indicators, or a second combination of the wideband channel quality indicator and channel quality indicators selected by the base station from the channel quality indicators of the subbands as the channel quality information that needs to be reported from the user device to the base station.

According to a fifth aspect of the present invention, in the base station of the third aspect, after selecting the first combination, the determining unit is configured to select, based on a second reference value for the number of user devices, only the wideband channel quality indicator as the channel quality information that needs to be reported from the user device to the base station.

According to a sixth aspect of the present invention, in the base station of the fourth aspect, after selecting the first combination, the determining unit is configured to select, based on a second reference value for the extracted wideband channel quality indicator, only the wideband channel quality indicator as the channel quality information that needs to be reported from the user device to the base station.

According to a seventh aspect of the present invention, in the base station of the second, fourth, or sixth aspect, the determining unit is configured to report the selection result to the user device by higher-layer signaling as information unique to the user device.

According to an eighth aspect of the present invention, in the base station of the third or fifth aspect, the determining unit is configured to report the selection result to the cell or the sector by higher-layer signaling as information unique to the cell or the sector.

A ninth aspect of the present invention provides a user device communicating with the base station of any one of the second through eighth aspect. The user device includes a moving speed measuring unit configured to measure the moving speed of the user device.

A tenth aspect of the present invention provides a base station for a mobile communication system. The base station includes a quality requirement information determining unit configured to obtain a quality requirement of a user device reporting channel quality information at regular intervals using an uplink control channel and to determine whether the obtained quality requirement is less than or equal to a predetermined reference level; and a determining unit configured to allow the user device to use an uplink shared channel if the quality requirement information determining unit determines that the quality requirement is greater than the predetermined reference level.

According to an eleventh aspect of the present invention, the base station of the tenth aspect further includes a multiplexing determining unit configured to determine whether a number of multiplexed signals transmitted via the uplink control channel is less than or equal to a predetermined value if the quality requirement information determining unit determines that the quality requirement is less than or equal to the predetermined reference level. If the multiplexing determining unit determines that the number of multiplexed signals is greater than the predetermined value, the determining unit allows the user device to use the uplink shared channel.

A twelfth aspect of the present invention provides a base station for a mobile communication system. The base station includes a resource block usage determining unit configured to determine, when resource blocks are allocated by the base station to user devices reporting channel quality information at regular intervals using an uplink control channel, whether a ratio of the allocated resource blocks to all resource blocks available in the mobile communication system is less than or equal to a predetermined reference ratio; and a determining unit configured to request the user devices to report the channel quality information using an uplink shared channel if the resource block usage determining unit determines that the ratio is less than or equal to the predetermined reference ratio.

A thirteenth aspect of the present invention provides a base station for a mobile communication system. The base station includes a reception quality determining unit configured to determine, when resource blocks are allocated by the base station to user devices reporting channel quality information at regular intervals using an uplink control channel, whether a reception quality level of the uplink control channel is less than or equal to a predetermined reference value; and a determining unit configured to request the user devices to report the channel quality information using an uplink shared channel if the reception quality determining unit determines that the reception quality level is less than or equal to the predetermined reference value.

A fourteenth aspect of the present invention provides a method of determining a mode of reporting channel quality information from a user device to a base station for a mobile communication system. The method includes the steps of detecting predetermined information regarding the user device; and determining types of the channel quality information that need to be reported from the user device to the base station based on the detected information.

According to a fifteenth aspect of the present invention, in the method of the fourteenth aspect, in the detecting step, a signal indicating a moving speed of the user device is received from the user device and the moving speed of the user device is detected based on the signal; and in the determining step, a wideband channel quality indicator indicating reception quality of an entire system frequency band allocated to the mobile communication system, or a combination of the wideband channel quality indicator and one or more channel quality indicators of subbands in the system frequency band is selected based on the moving speed as the channel quality information that needs to be reported from the user device to the base station.

According to a sixteenth aspect of the present invention, in the method of the fourteenth aspect, when a combination of a wideband channel quality indicator indicating reception quality of an entire system frequency band allocated to the mobile communication system and one or more channel quality indicators of subbands in the system frequency band is currently selected as the channel quality information that needs to be reported from the user device to the base station, in the detecting step, a number of user devices in a cell or a sector formed by the base station is detected; and in the determining step, a first combination of the wideband channel quality indicator and highest M channel quality indicators selected by the user device from the channel quality indicators of the subbands or an average of the M channel quality indicators, or a second combination of the wideband channel quality indicator and channel quality indicators selected by the base station from the channel quality indicators of the subbands is selected, based on a first reference value for the number of user devices, as the channel quality information that needs to be reported from the user device to the base station.

According to a seventeenth aspect of the present invention, in the method of the fourteenth aspect, when a combination of a wideband channel quality indicator indicating reception quality of an entire system frequency band allocated to the mobile communication system and one or more channel quality indicators of subbands in the system frequency band is currently selected as the channel quality information that needs to be reported from the user device to the base station, in the detecting step, the wideband channel quality indicator is extracted from a signal received from the user device; and in the determining step, a first combination of the wideband channel quality indicator and highest M channel quality indicators selected by the user device from the channel quality indicators of the subbands or an average of the M channel quality indicators, or a second combination of the wideband channel quality indicator and channel quality indicators selected by the base station from the channel quality indicators of the subbands is selected, based on a first reference value for the extracted wideband channel quality indicator, as the channel quality information that needs to be reported from the user device to the base station.

According to an eighteenth aspect of the present invention, the method of the sixteenth aspect further includes the step of after the first combination is selected, selecting, based on a second reference value for the number of user devices, only the wideband channel quality indicator as the channel quality information that needs to be reported from the user device to the base station.

According to a nineteenth aspect of the present invention, the method of the seventeenth aspect further includes the step of after the first combination is selected, selecting, based on a second reference value for the extracted wideband channel quality indicator, only the wideband channel quality indicator as the channel quality information that needs to be reported from the user device to the base station.

According to a twentieth aspect of the present invention, the method of the fifteenth, seventeenth, or eighteenth aspect further includes the step of reporting the selection result based on the number of user devices to the user device by higher-layer signaling as information unique to the user device.

According to a twenty first aspect of the present invention, the method of the sixteenth or eighteenth aspect further includes the step of reporting the selection result based on the extracted wideband channel quality indicator to the cell or the sector by higher-layer signaling as information unique to the cell or the sector.

A twenty second aspect of the present invention provides a method of determining a mode of reporting channel quality information from a user device to a base station for a mobile communication system. The method includes the steps of obtaining a quality requirement of the user device reporting the channel quality information at regular intervals using an uplink control channel and determining whether the obtained quality requirement is less than or equal to a predetermined reference level; and allowing the user device to use an uplink shared channel if the quality requirement is greater than the predetermined reference level.

According to a twenty third aspect of the present invention, the method of the twenty second aspect further includes the steps of determining whether a number of multiplexed signals transmitted via the uplink control channel is less than or equal to a predetermined value if the quality requirement is less than or equal to the predetermined reference level; and allowing the user device to use the uplink shared channel if the number of multiplexed signals is greater than the predetermined value.

A twenty fourth aspect of the present invention provides a method of determining a mode of reporting channel quality information from user devices to a base station for a mobile communication system. The method includes the steps of determining, when resource blocks are allocated by the base station to the user devices reporting the channel quality information at regular intervals using an uplink control channel, whether a ratio of the allocated resource blocks to all resource blocks available in the mobile communication system is less than or equal to a predetermined reference ratio; and requesting the user devices to report the channel quality information using an uplink shared channel if the ratio is less than or equal to the predetermined reference ratio.

A twenty fifth aspect of the present invention provides a method of determining a mode of reporting channel quality information from user devices to a base station for a mobile communication system. The method includes the steps of determining, when resource blocks are allocated by the base station to the user devices reporting the channel quality information at regular intervals using an uplink control channel, whether a reception quality level of the uplink control channel is less than or equal to a predetermined reference value; and requesting the user devices to report the channel quality information using an uplink shared channel if the reception quality level is less than or equal to the predetermined reference value.

Advantageous Effect of the Invention

An aspect of the present invention provides a method for determining a CQI reporting mode for reporting channel quality indicators from a user device to a base station, and the user device and the base station adapted for the method.

EXPLANATION OF REFERENCES

Figure 1:
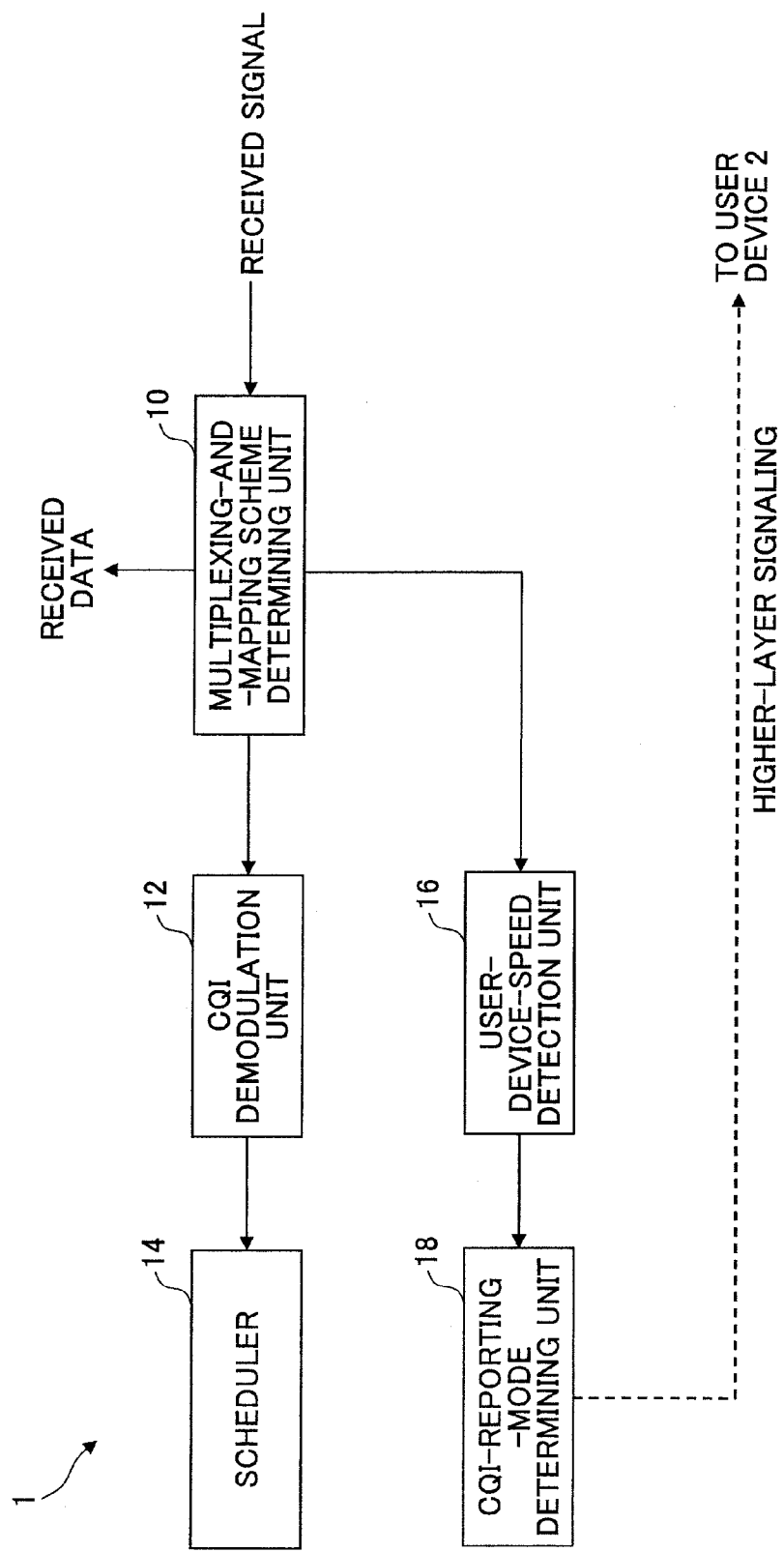
FIG. 1 is a schematic block diagram illustrating a configuration of a base station according to a first embodiment of the present invention.

1 Base station
10 Multiplexing-and-mapping scheme determining unit
12 CQI demodulation unit
14 Scheduler
16 User-device-speed detection unit
18, 48, 68 CQI-reporting-mode determining unit
2, 4, 6 User device
26 Multiplexing-and-mapping scheme determining unit
20 CQI measuring unit
22 CQI-reporting-mode control unit
64 Reception quality information determining unit
76 Information determining unit

BEST MODE FOR CARRYING OUT THE INVENTION

Preferred embodiments of the present invention are described below with reference to the accompanying drawings. Throughout the accompanying drawings, the same reference numbers are used for parts having the same functions, and overlapping descriptions of those parts are omitted.

Types (or report formats) of channel quality indicators (CQI) to be reported from a user device to a base station are described below. Here, it is assumed that a CQI is obtained by measuring the reception quality of a pilot channel (reference signal) transmitted from the base station and converting the measurement into a value in a different unit (e.g., decibel). The reception quality may be represented, for example, by received signal power (S), a received signal-to-interference plus noise power ratio (SINR), or a received signal-to-interference power ratio (SIR).

(1) Reporting Only Wideband CQI

A wideband CQI indicates the channel quality of the entire frequency band (e.g., 20 MHz) allocated for a system (i.e., system frequency band). For example, the wideband CQI is represented by an average of CQIs measured at a predetermined frequency interval in the system frequency band. In this reporting mode, one CQI is reported for one wide band.

(2) Reporting Wideband CQI and Subband CQIs selected by User Device

A system frequency band is divided into multiple subbands having a predetermined bandwidth. A subband CQI (frequency selective CQI) is an average CQI of each subband. In other words, average CQIs are obtained for respective subbands. The user device ranks subbands in descending order of the subband CQIs (average CQIs), selects the highest M subbands (best M subbands), and selects M subband CQIs corresponding to the selected M subbands or an average of the M subband CQIs. Here, M is determined by the user device and indicates a natural number greater than or equal to 1. For example, M may be set at 2. In this reporting mode, a wideband CQI and the M subband CQIs or an average of the M subband CQIs are reported (transmitted) from the user device to the base station. The user device may also report ID information (subband numbers) of the subbands corresponding to the M subband CQIs.

(3) Reporting wideband CQI and sub-Band CQIs specified by base station

In this reporting mode, the base station specifies (or selects) subband CQIs. In other words, a wideband CQI and sub-band CQIs specified by the base station are reported from the user device to the base station. The base station specifies, for example, subband CQIs of all subbands in the system frequency band.

(4) Timing of reporting CQIs

CQIs are reported regularly (regular reporting) and irregularly (irregular reporting). In regular reporting, the user device is allowed to use either the PUCCH or the PUSCH to report CQIs. For example, the user device reports (or transmits) one or more subband CQIs selected by the user device at regular intervals to the base station using the PUCCH or the PUSCH. Meanwhile, in irregular reporting, the user device reports CQIs to the base station in response to a request from the base station. In this case, the user device can use only the PUSCH.

<First Embodiment>

A base station according to a first embodiment of the present invention is described below with reference to FIG. 1. As shown in FIG. 1, a base station 1 of the first embodiment includes a multiplexing-and-mapping scheme determining unit 10, a CQI demodulation unit 12, a scheduler 14, a user-device-speed detection unit 16, and a CQI-reporting-mode determining unit 18.

The multiplexing-and-mapping scheme determining unit 10 receives a signal from a user device 2 (see FIG. 2) and determines multiplexing and mapping schemes applied to the received signal by the user device 2. Also, the multiplexing-and-mapping scheme determining unit 10 separates received data, CQIs, and user-device-speed information from the received signal based on the determined multiplexing and mapping schemes. The user-device-speed information indicates the moving speed of the user device 2 sending the received signal. The user device 2 obtains the user-device-speed information according to a predetermined method, multiplexes the user-device-speed information in a signal according to a predetermined method, and transmits the signal to the base station 1. Further, the multiplexing-and-mapping scheme determining unit 10 outputs the received data to a received data processing unit (not shown), the CQIs to the CQI demodulation unit 12, and the user-device-speed information to the user-device-speed detection unit 16.

The CQI demodulation unit 12 demodulates the CQIs received from the multiplexing-and-mapping scheme determining unit 10 and outputs the demodulated CQIs to the scheduler 14.

The scheduler 14 performs scheduling of radio resources based on the CQIs received from the CQI demodulation unit 12.

The user-device-speed detection unit 16 detects the moving speed of the user device 2 based on the user-device-speed information received from the multiplexing-and-mapping scheme determining unit 10. Also, the user-device-speed detection unit 16 reports the detected moving speed to the CQI-reporting-mode determining unit 18.

The CQI-reporting-mode determining unit 18 compares the moving speed reported from the user-device-speed detection unit 16 with a reference speed v (km/h) to determine whether the moving speed is less than or equal to the reference speed v. Also, the CQI-reporting-mode determining unit 18 determines a CQI reporting mode for the user device 2 based on the comparison result. For example, if the moving speed of the user device 2 is greater than the reference speed v, the CQI-reporting-mode determining unit 18 selects only a wideband CQI as the channel quality information that needs to be reported from the user device 2. Meanwhile, if the moving speed of the user device 2 is less than or equal to the reference speed v, the CQI-reporting-mode determining unit 18 selects a wideband CQI and subband CQIs as the channel quality information that needs to be reported from the user device 2.

The CQI-reporting-mode determining unit 18 reports the determined CQI reporting mode to the user device 2 by, for example, higher-layer signaling.

Figure 2:
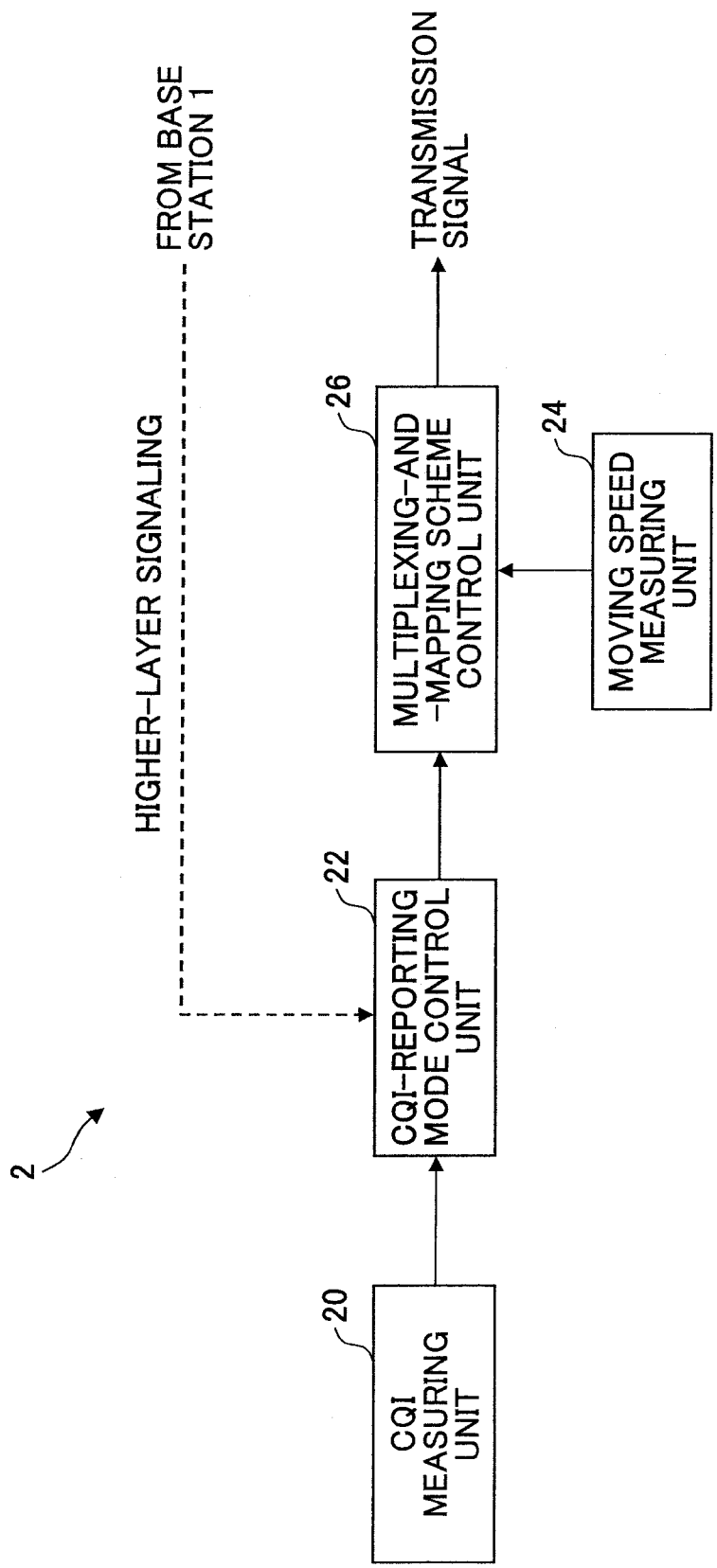
FIG. 2 is a schematic block diagram illustrating a configuration of a user device communicating with the base station of FIG. 1.

The user device 2 used together with the base station 1 of the first embodiment is described below with reference to FIG. 2. As shown in FIG. 2, the user device 2 includes a CQI measuring unit 20, a CQI-reporting-mode control unit 22, a moving speed measuring unit 24, and a multiplexing-and-mapping scheme control unit 26.

The CQI measuring unit 20 measures, for example, received signal power (S), a received signal-to-interference plus noise power ratio (SINR), and/or a received signal-to-interference power ratio (SIR) based on a reference signal from the base station 1 to obtain CQIs. The obtained CQIs include a wideband CQI and subband CQIs. Also, the CQI measuring unit 20 outputs the obtained CQIs to the CQI-reporting-mode control unit 22.

The CQI-reporting-mode control unit 22 receives the CQIs from the CQI measuring unit 20 and also receives information indicating a CQI reporting mode reported from the base station 1 by, for example, higher-layer signaling. The CQI-reporting-mode control unit 22 selects one or more of the CQIs received from the CQI measuring unit 20 based on the received CQI reporting mode and outputs the selected CQIs to the multiplexing-and-mapping scheme control unit 26.

The moving speed measuring unit 24 measures the moving speed of the user device 2. For example, the moving speed measuring unit 24 measures the moving speed using a global positioning system (GPS) signal. The moving speed measuring unit 24 outputs information indicating the measured moving speed of the user device 2 to the multiplexing-and-mapping scheme control unit 26.

The multiplexing-and-mapping scheme control unit 26 receives the CQIs from the CQI-reporting-mode control unit 22 and receives the information indicating the moving speed of the user device 2 from the moving speed measuring unit 24. The multiplexing-and-mapping scheme control unit 26 multiplexes the received CQIs, the received information indicating the moving speed, and user information from a buffer (not shown), and maps the multiplexed information to generate a transmission signal. The transmission signal goes through predetermined processing and is transmitted to the base station 1.

Figure 3:
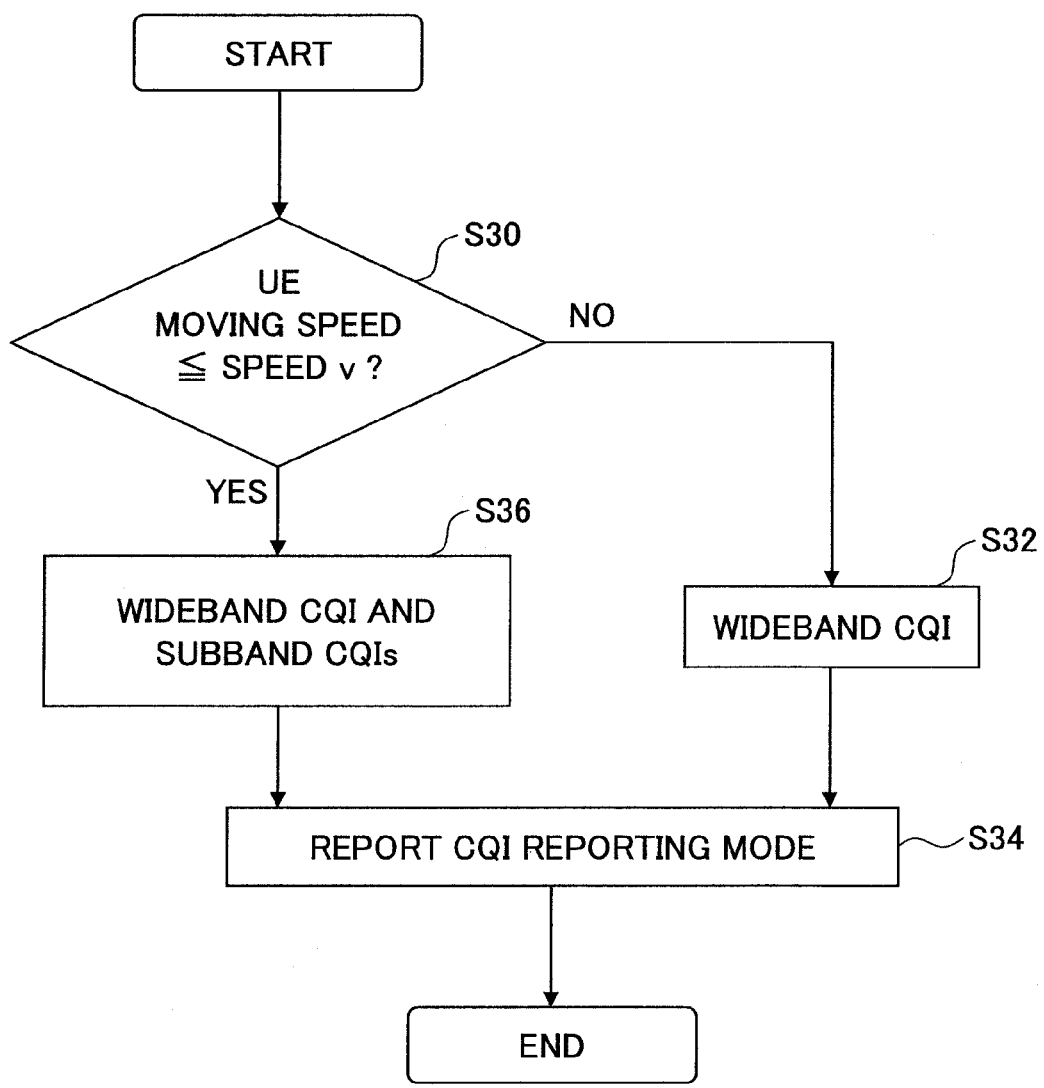
FIG. 3 is a flowchart showing a method of determining a CQI reporting mode according to the first embodiment of the present invention.

A method of determining a CQI reporting mode at the base station 1 of this embodiment is described below with reference to FIG. 3. The CQI-reporting-mode determining unit 18 determines whether the moving speed reported from the user-device-speed detection unit 16 is less than or equal to the reference speed v (km/h) (step S30). If the moving speed is greater than the reference speed v (NO in step S30), the CQI-reporting-mode determining unit 18 selects only a wideband CQI as the channel quality information that needs to be reported from the user device 2 to the base station 1 (step S32). Next, the CQI-reporting-mode determining unit 18 reports the determined CQI reporting mode to the user device 2 (step S34).

Meanwhile, if the moving speed is less than or equal to the reference speed v (YES in step S30), the CQI-reporting-mode determining unit 18 selects a wideband CQI and a predetermined number of subband CQIs as the channel quality information that needs to be reported from the user device 2 to the base station 1 (step S36). Next, the CQI-reporting-mode determining unit 18 reports the determined CQI reporting mode to the user device 2 (step S34).

The reference speed may be determined based on, for example, the propagation environment in a cell or a sector formed by the base station 1. For example, the reference speed may be set at a high value when the propagation environment is good and may be set at a low value when the propagation environment is poor.

The number of subband CQIs may be predetermined between the base station 1 and the user device 2. For example, the number of subband CQIs may be determined such that the sum of the number of bits for the wideband CQI and the number of bits for the subband CQIs does not exceed the total number of bits allocated for CQI reporting (e.g., 10 bits). The subband CQIs may be selected by the user device 2 or specified by the base station 1.

As described above, according to the base station 1 and the method of determining a CQI reporting mode of the first embodiment, the user device reports (or transmits) a predetermined number of subband CQIs in addition to a wideband CQI to the base station 1 if the moving speed of the user device is less than or equal to a reference speed. This enables the base station 1 to obtain detailed information on the reception quality at the user device and thereby to properly perform scheduling based on the detailed information.

Meanwhile, if the moving speed of the user device is greater than the reference speed, the user device reports (or transmits) only the wideband CQI to the base station 1. When the moving speed of the user device is high, the reception quality, particularly subband CQIs, between the base station 1 and the user device changes rapidly. If the base station 1 performs scheduling based on subband CQIs in addition to a wideband CQI under such a circumstance, the scheduling result may not properly reflect the actual reception quality at a time when the user device transmits data according to the scheduling result. Meanwhile, as described above, a wideband CQI is an average of CQIs obtained at a predetermined frequency interval in the system frequency band, and therefore can represent the actual reception quality more properly than rapidly changing subband CQIs. For these reasons, when the user device is moving at a speed greater than the reference speed, it is preferable for the base station 1 to perform scheduling based only on the wideband CQI.

<Second Embodiment>

Figure 4:
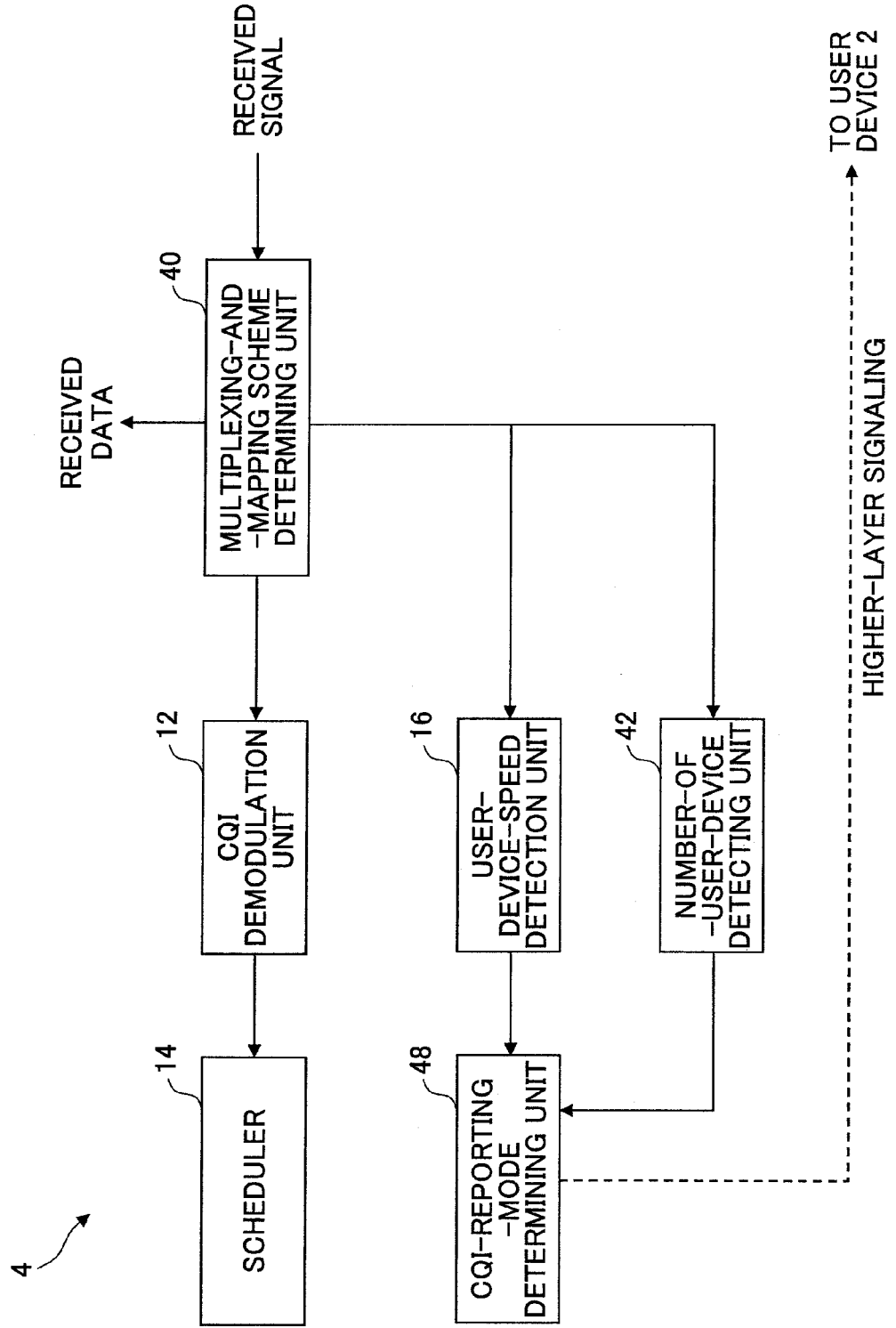
FIG. 4 is a schematic block diagram illustrating a configuration of a base station according to a second embodiment of the present invention.

A base station according to a second embodiment of the present invention is described below with reference to FIG. 4. As shown in FIG. 4, a base station 4 of the second embodiment includes a multiplexing-and-mapping scheme determining unit 40, a CQI demodulation unit 12, a scheduler 14, a user-device-speed detection unit 16, a CQI-reporting-mode determining unit 48, and a number-of-user-device detecting unit 42. The CQI demodulation unit 12, the scheduler 14, and the user-device-speed detection unit 16 have substantially the same configurations and functions as described in the first embodiment, and overlapping descriptions of those components are omitted here.

The multiplexing-and-mapping scheme determining unit 40 receives a signal from the user device 2 (FIG. 2) and determines multiplexing and mapping schemes applied to the received signal by the user device 2. Then, the multiplexing-and-mapping scheme determining unit 40 separates received data, CQIs, and user-device-speed information from the received signal based on the determined multiplexing and mapping schemes. Also, the multiplexing-and-mapping scheme determining unit 40 generates number-of-user-device information indicating the number of user devices ready to communicate in a cell or a sector formed by the base station 4 based on received signals from the user devices. Further, the multiplexing-and-mapping scheme determining unit 40 outputs the received data to a received data processing unit (not shown), the CQIs to the CQI demodulation unit 12, the user-device-speed information to the user-device-speed detection unit 16, and the number-of-user-device information to the number-of-user-device detecting unit 42.

The number-of-user-device detecting unit 42 detects the number of user devices based on the number-of-user-device information received from the multiplexing-and-mapping scheme determining unit 40. Also, the number-of-user-device detecting unit 42 reports the detected number of user devices to the CQI-reporting-mode determining unit 48.

The CQI-reporting-mode determining unit 48 compares the moving speed reported from the user-device-speed detection unit 16 with a reference speed v (km/h) to determine whether the moving speed is less than or equal to the reference speed v. If the moving speed is less than or equal to the reference speed v, the CQI-reporting-mode determining unit 48 also compares the number of user devices reported from the number-of-user-device detecting unit 42 with a first reference value N1 to determine whether the number of user devices is less than or equal to the first reference value N1. The CQI-reporting-mode determining unit 18 determines a CQI reporting mode for the user device 2 based on the comparison result(s).

For example, if the moving speed of the user device 2 is greater than the reference speed v, the CQI-reporting-mode determining unit 48 selects only a wideband CQI as the channel quality information that needs to be reported (or transmitted) from the user device 2. Meanwhile, if the moving speed of the user device 2 is less than or equal to the reference speed v, the CQI-reporting-mode determining unit 48 selects a wideband CQI and a predetermined number of subband CQIs as the channel quality information that needs to be reported from the user device 2.

Also, if the moving speed of the user device 2 is less than or equal to the reference speed v and the number of user devices is less than or equal to the first reference value N1, the CQI-reporting-mode determining unit 48 selects a wideband CQI and subband CQIs specified by the base station 4 as the channel quality information that needs to be reported from the user device 2. The subband CQIs specified by the base station 4 preferably include CQIs of all subbands. However, the number of subband CQIs specified by the base station 4 may be any value from one through the maximum number of subbands.

Also, if the moving speed of the user device 2 is less than or equal to the reference speed v and the number of user devices is greater than the first reference value N1, the CQI-reporting-mode determining unit 48 may select a wideband CQI; M subband CQIs selected by the user device 2 or an average of the M subband CQIs (best M subband average CQI); and ID information of the M subbands as the channel quality information that needs to be reported from the user device 2.

Alternatively, if the moving speed is less than or equal to the reference speed v and the number of user devices is greater than the first reference value N1, the CQI-reporting-mode determining unit 48 may also compare the number of user devices reported from the number-of-user-device detecting unit 42 with a second reference value N2 to determine whether the number of user devices is less than or equal to the second reference value N2. If the number of user devices is greater than the second reference value N2, the CQI-reporting-mode determining unit 48 may select only a wideband CQI as the channel quality information that needs to be reported from the user device 2.

The CQI-reporting-mode determining unit 18 reports the determined CQI reporting mode to the user device 2 by, for example, higher-layer signaling.

The user device 2 used together with the base station 4 of the second embodiment is described below. The user device 2 of the second embodiment has a configuration and functions similar to those of the first embodiment. However, because of the difference in the configurations of the base stations 1 and 4, the user device 2 of the second embodiment has additional functions as described below.

When the CQI reporting mode reported from the base station 4 requests transmission of a wideband CQI, a best M subband average CQI, and subband ID information, the CQI-reporting-mode control unit 22 (FIG. 2) of the user device 2 selects, from multiple CQIs received from the CQI measuring unit 20, a wideband CQI and a best M subband average CQI and generates ID information of M subbands corresponding to the best M subband average CQI. When the CQI reporting mode reported from the base station 4 requests transmission of a wideband CQI and subband CQIs specified by the base station 4, the CQI-reporting-mode control unit 22 selects, from multiple CQIs received from the CQI measuring unit 20, a wideband CQI and subband CQIs specified by the base station 4. The CQI-reporting-mode control unit 22 outputs the selected (M+1) CQIs and the ID information to the multiplexing-and-mapping scheme control unit 26.

Figure 5:
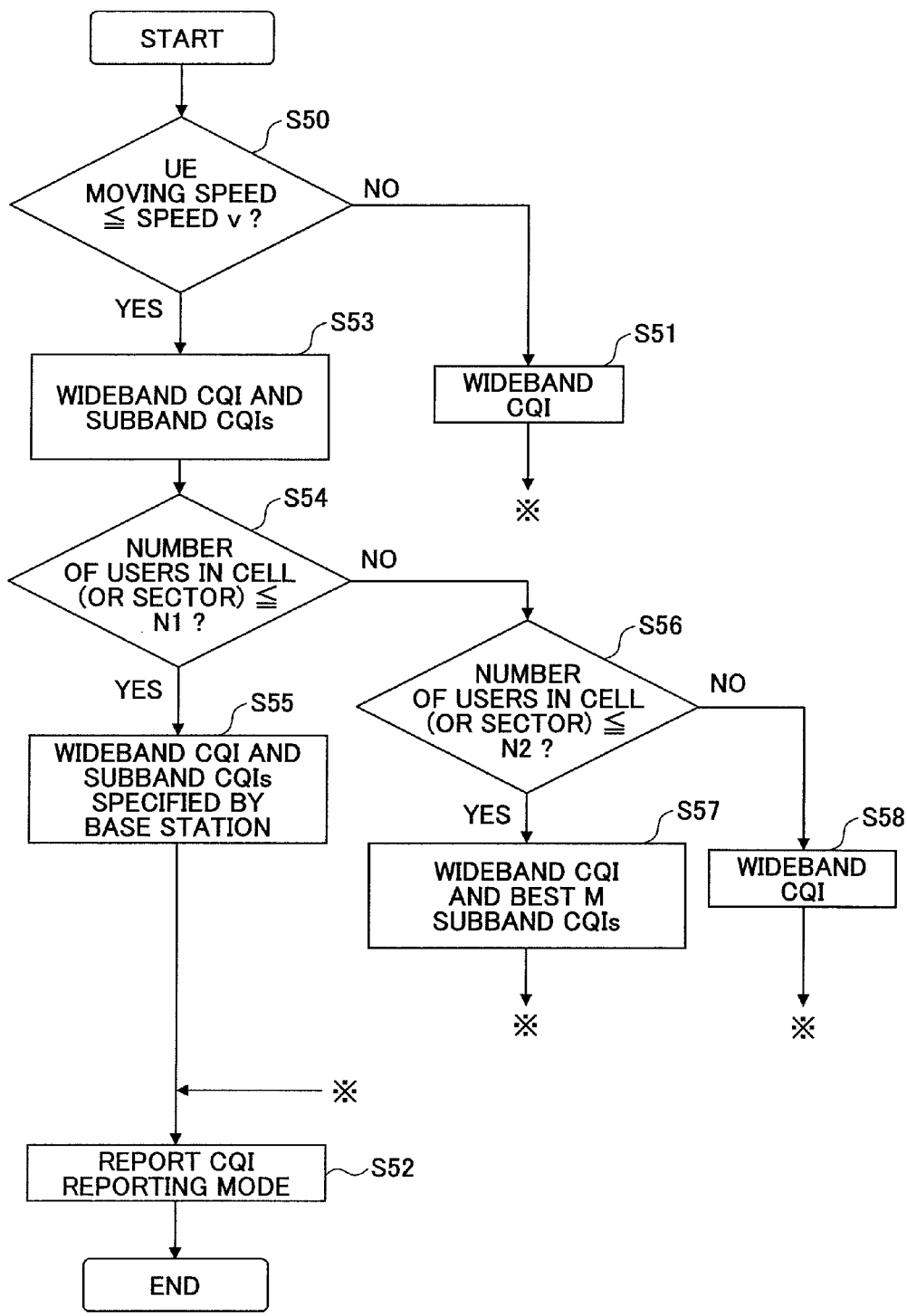
FIG. 5 is a flowchart showing a method of determining a CQI reporting mode according to the second embodiment of the present invention.

A method of determining a CQI reporting mode at the base station 4 of this embodiment is described below with reference to FIG. 5. The CQI-reporting-mode determining unit 48 determines whether the moving speed reported from the user-device-speed detection unit 16 is less than or equal to the reference speed v (km/h) (step S50). If the moving speed is greater than the reference speed v (NO in step S50), the CQI-reporting-mode determining unit 48 selects only a wideband CQI as the channel quality information that needs to be reported from the user device 2 to the base station 4 (step S51). Next, the CQI-reporting-mode determining unit 48 reports (transmits) the determined CQI reporting mode to the user device 2 (step S52).

Meanwhile, if the moving speed is less than or equal to the reference speed v (YES in step S50), the CQI-reporting-mode determining unit 48 selects a wideband CQI and a predetermined number of subband CQIs as the channel quality information that needs to be reported from the user device 2 to the base station 4 (step S53). Next, the CQI-reporting-mode determining unit 48 determines whether the number of user devices ready to communicate in a cell or a sector is less than or equal to the first reference value N1 (step S54).

If the number of user devices is less than or equal to the first reference value N1 (YES in step S54), the CQI-reporting-mode determining unit 48 selects a wideband CQI and subband CQIs specified by the base station 4 as the channel quality information that needs to be reported from the user device 2 (step S55). The determined CQI reporting mode is reported in step S52 to the user device 2 by, for example, higher-layer signaling.

Meanwhile, if the number of user devices is greater than the first reference value N1 (NO in step S54), the CQI-reporting-mode determining unit 48 further determines whether the number of user devices is less than or equal to the second reference value N2 (step S56). If the number of user devices is less than or equal to the second reference value N2 (YES in step S56), the CQI-reporting-mode determining unit 48 selects a wideband CQI; M subband CQIs selected by the user device 2 or an average of the M subband CQIs (best M subband average CQI); and ID information of subbands corresponding to the M subband CQIs as the channel quality information that needs to be reported from the user device 2 (step S57). The determined CQI reporting mode is reported to the user device 2 (step S52).

Meanwhile, if the number of user devices is greater than the second reference value N2 (NO in step S56), the CQI-reporting-mode determining unit 56 selects only a wideband CQI as the channel quality information that needs to be reported from the user device 2 (step S58). The determined CQI reporting mode is reported to the user device 2 (step S52).

Thus, with the base station 4 and the method of determining a CQI reporting mode of the second embodiment, a CQI reporting mode is determined based on the moving speed of the user device 2 as well as based on the number of user devices in a cell or a sector.

If subband CQIs are reported in addition to a wideband CQI when there are a large number of user devices, the base station needs to process a large amount of information. This in turn increases the processing time at the base station. The base station 4 and the method of determining a CQI reporting mode of the second embodiment make it possible to properly determine a CQI reporting mode according to the number of user devices in a cell or a sector and thereby make it possible to prevent the above problem.

When the moving speed of the user device 2 is low and the number of user devices in a cell or a sector is small, the base station 4 requests the user device 2 to report a wideband CQI and subband CQIs specified by the base station 4. The base station 4 may specify subband CQIs of all subbands in the system frequency band. This enables the base station 4 to receive a wideband CQI indicating the channel quality of the entire system frequency band and subband CQIs indicating the channel quality of all subbands, and thereby to properly perform scheduling based on the received CQIs.

When the moving speed of the user device 2 is low and the number of user devices in a cell or a sector is modest, the base station 4 requests the user device 2 to report a wideband CQI; M subband CQIs selected by the user device 2 or an average of the M subband CQIs (best M subband average CQI); and ID information of the M subbands. This enables the base station 4 to receive M subband CQIs or an average of the M subband CQIs in addition to a wideband CQI, and thereby to properly perform scheduling based on the received CQIs.

According to the second embodiment, the determined CQI reporting mode may be reported to all user devices in a cell or a sector. For example, when the number of user devices is greater than the second reference value N2, the base station 4 may report a CQI reporting mode (that is unique to a cell or a sector), which requests transmission of only a wideband CQI, to all user devices in a cell or a sector by higher-layer signaling. This method makes it possible to cause all user devices to report only the wideband CQI and thereby to prevent the above problem.

When the number of user devices is large (e.g., when the number of user devices is greater than the second reference value N2), the CQI-reporting-mode determining unit 48 may set the reference speed v at a small value. With this method, when the number of user devices is large, the user device reports only the wideband CQI even if its moving speed is not so high. This in turn makes it possible for the CQI-reporting-mode determining unit 48 to determine a CQI reporting mode requesting to report only the wideband CQI without performing step S54, and thereby makes it possible to reduce the processing load.

<Third Embodiment>

Figure 6:
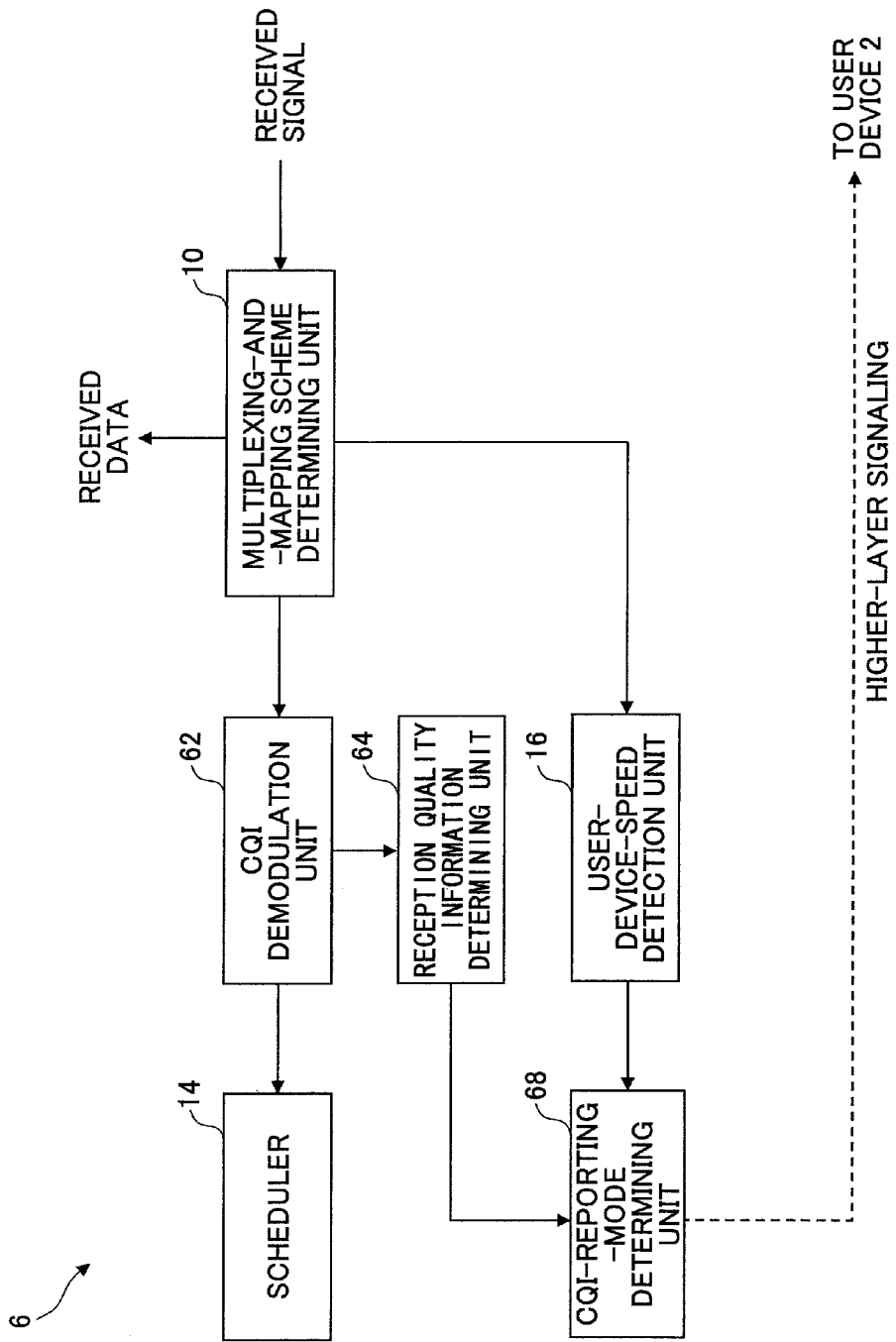
FIG. 6 is a schematic block diagram illustrating a configuration of a base station according to a third embodiment of the present invention.

A base station according to a third embodiment of the present invention is described below with reference to FIG. 6. As shown in FIG. 6, a base station 6 of the third embodiment includes a multiplexing-and-mapping scheme determining unit 10, a CQI demodulation unit 62, a scheduler 14, a user-device-speed detection unit 16, a CQI-reporting-mode determining unit 68, and a reception quality information determining unit 64. The multiplexing-and-mapping scheme determining unit 10, the scheduler 14, and the user-device-speed detection unit have substantially the same configurations and functions as described in the first or second embodiment, and overlapping descriptions of those components are omitted here.

The CQI demodulation unit 62 receives separated and demapped CQIs from the multiplexing-and-mapping scheme determining unit 10, demodulates the received CQIs, and outputs the demodulated CQIs to the scheduler 14 and the reception quality information determining unit 64.

The reception quality information determining unit 64 extracts a wideband CQI (preferably, uplink average received signal power S or an average received SINR) from the CQIs received from the CQI demodulation unit 62, and outputs the wideband CQI to the CQI-reporting-mode determining unit 68.

The CQI-reporting-mode determining unit 68 compares the moving speed reported from the user-device-speed detection unit 16 with a reference speed v (km/h) to determine whether the moving speed is less than or equal to the reference speed v. If the moving speed is less than or equal to the reference speed v, the CQI-reporting-mode determining unit 68 also compares the wideband CQI reported from the reception quality information determining unit 64 and a first reference quality value S1 to determine whether the wideband CQI is greater than or equal to the first reference quality value S1. The CQI-reporting-mode determining unit 68 determines a CQI reporting mode for the user device 2 based on the comparison result(s).

For example, if the moving speed of the user device 2 is greater than the reference speed v, the CQI-reporting-mode determining unit 68 selects only a wideband CQI as the channel quality information that needs to be reported from the user device 2. If the moving speed of the user device 2 is less than or equal to the reference speed v, the CQI-reporting-mode determining unit 68 may select a wideband CQI, a predetermined number of subband CQIs, and ID information of the corresponding subbands as the channel quality information that needs to be reported from the user device 2.

Also, if the moving speed of the user device 2 is less than or equal to the reference speed v and the wideband CQI reported from the reception quality information determining unit 64 is greater than or equal to the first reference quality value S1, the CQI-reporting-mode determining unit 68 selects a wideband CQI and subband CQIs specified by the base station 6 as the channel quality information that needs to be reported from the user device 2. The subband CQIs specified by the base station 6 preferably include CQIs of all subbands. However, the number of subband CQIs specified by the base station 4 may be any value from one through the maximum number of subbands.

Also, if the moving speed of the user device 2 is less than or equal to the reference speed v and the wideband CQI reported from the reception quality information determining unit 64 is less than the first reference quality value S1, the CQI-reporting-mode determining unit 68 selects a wideband CQI, subband CQIs selected by the user device 2, and ID information of the corresponding subbands as the channel quality information that needs to be reported from the user device 2.

Alternatively, if the moving speed of the user device 2 is less than or equal to the reference speed v and the wideband CQI reported from the reception quality information determining unit 64 is less than the first reference quality value S1, the CQI-reporting-mode determining unit 68 may compare the wideband CQI with a second reference quality value S2 to determine whether the wideband CQI is greater than or equal to the second reference quality value S2. If the wideband CQI is less than the second reference quality value S2, the CQI-reporting-mode determining unit 68 selects only a wideband CQI as the channel quality information that needs to be reported from the user device 2.

The CQI-reporting-mode determining unit 68 reports the determined CQI reporting mode to the user device 2.

Figure 7:
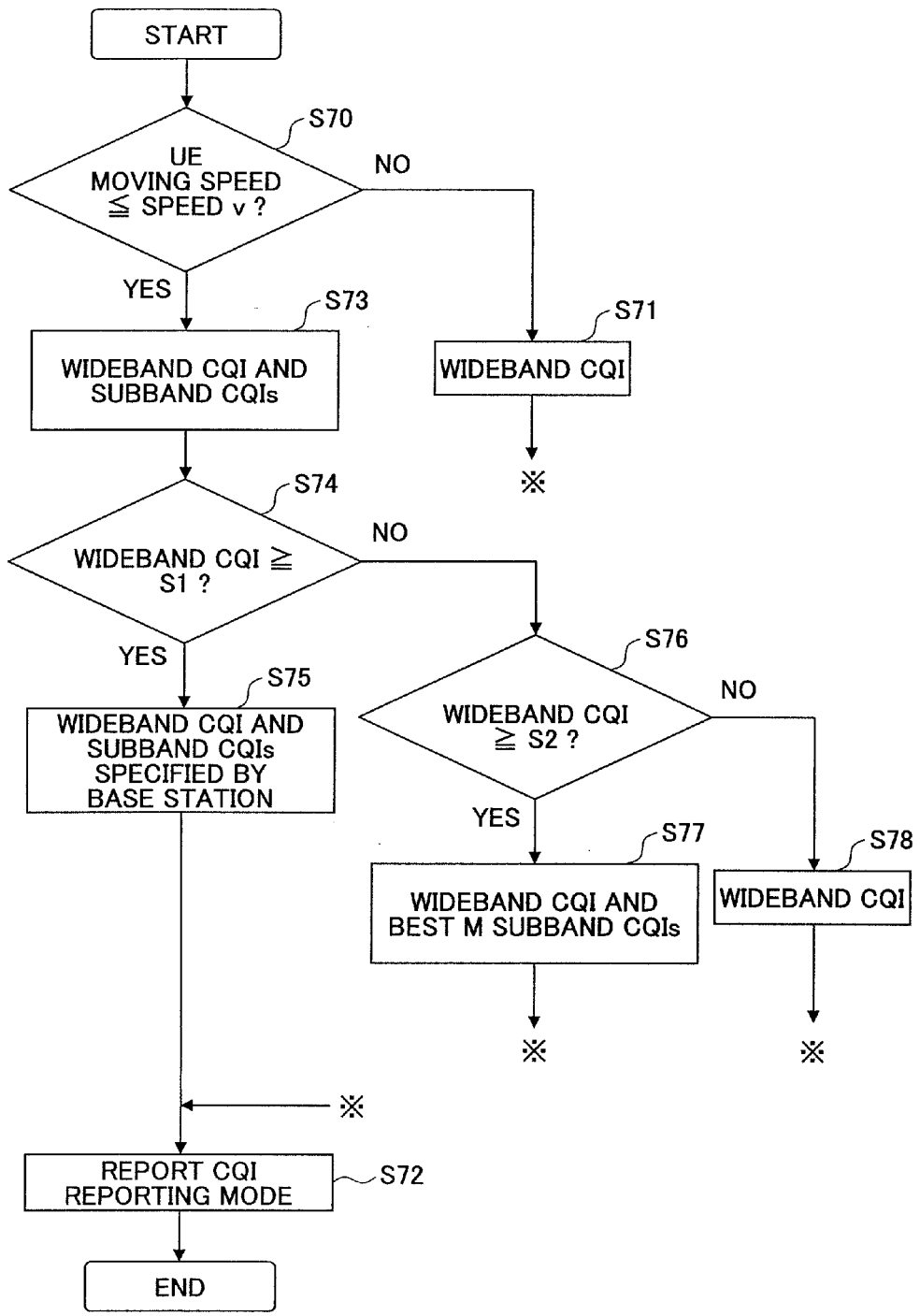
FIG. 7 is a flowchart showing a method of determining a CQI reporting mode according to the third embodiment of the present invention.

A method of determining a CQI reporting mode at the base station 6 of this embodiment is described below with reference to FIG. 7. In the descriptions below, it is assumed that the user device 2 of the second embodiment is communicating with the base station 6.

The CQI-reporting-mode determining unit 68 determines whether the moving speed reported from the user-device-speed detection unit 16 is less than or equal to the reference speed v (km/h) (step S70). If the moving speed is greater than the reference speed v (NO in step S70), the CQI-reporting-mode determining unit 68 selects only a wideband CQI as the channel quality information that needs to be reported from the user device 2 (step S71). Next, the CQI-reporting-mode determining unit 68 reports (transmits) the determined CQI reporting mode to the user device 2 (step S72).

Meanwhile, if the moving speed is less than or equal to the reference speed v (YES in step S70), the CQI-reporting-mode determining unit 48 selects a wideband CQI and a predetermined number of subband CQIs as the channel quality information that needs to be reported from the user device 2 (step S73). Next, the CQI-reporting-mode determining unit 68 determines whether the wideband CQI in a received signal from the user device 2 is greater than or equal to the first reference quality value S1 (step S74).

If the wideband CQI is greater than or equal to the first reference quality value S1 (YES in step S74), the CQI-reporting-mode determining unit 68 selects a wideband CQI and subband CQIs specified by the base station 6 as the channel quality information that needs to be reported from the user device 2 (step S75). The determined CQI reporting mode is reported in step S72 to the user device 2 by, for example, higher-layer signaling.

Meanwhile, if the wideband CQI is less than the first reference quality value S1 (NO in step S74), the CQI-reporting-mode determining unit 68 further determines whether the wideband CQI is greater than or equal to the second reference quality value S2 (step S76). If the wideband CQI is greater than or equal to the second reference quality value S2 (YES in step S76), the CQI-reporting-mode determining unit 68 selects a wideband CQI; M subband CQIs selected by the user device 2 or an average of the M subband CQIs (best M subband average CQI); and ID information of the corresponding M subbands as the channel quality information that needs to be reported from the user device 2 (step S77). The determined CQI reporting mode is reported to the user device 2 (step S72).

Meanwhile, if the wideband CQI is less than the second reference quality value S2 (NO in step S76), the CQI-reporting-mode determining unit 68 selects only a wideband CQI as the channel quality information that needs to be reported from the user device 2 (step S78). The determined CQI reporting mode is reported to the user device 2 (step S72).

Thus, with the base station 6, the user device 2, and the method of determining a CQI reporting mode of the third embodiment, a (next) CQI reporting mode is determined based on the moving speed of the user device as well as based on a wideband CQI reported from the user device 2. When the moving speed of the user device is low, the reception quality between the base station and the user device may not drastically change. Therefore, it is preferable to report subband CQIs in addition to a wideband CQI from the user device to the base station for scheduling. However, even if the moving speed of the user device is low, the user device may not be able to properly report subband CQIs if the reception quality between the base station and the user device is low. According to the third embodiment of the present invention, the base station requests a user device with good reception quality to report, for example, M subband CQIs or an average of the M subband CQIs (and ID information of the corresponding subbands) in addition to a wideband CQI and performs scheduling based on the reported CQIs to achieve high-quality (high volume and high data rate) communications. Meanwhile, the base station requests a user device with poor reception quality to report only a wideband CQI. Also, the base station requests a user device with very good reception quality to report subband CQIs specified by the base station in addition to a wideband CQI to further improve the quality of communications with the user device.

<Fourth Embodiment>

A base station and a method of determining a CQI reporting mode according to a fourth embodiment of the present invention are described below. In the method of determining a CQI reporting mode of the fourth embodiment, timing of reporting CQIs and a channel used to report the CQIs are determined. The method of the fourth embodiment may be used together with any one of the methods of the first through third embodiments. In the descriptions below, a wideband CQI, M subband CQIs selected by the user device, an average of the M subband CQIs (best M subband average CQI), and subband CQIs specified by the base station are simply called "CQIs" without distinction. The "CQIs" may be selected according to any one of the methods of the first through third embodiments.

Figure 8:
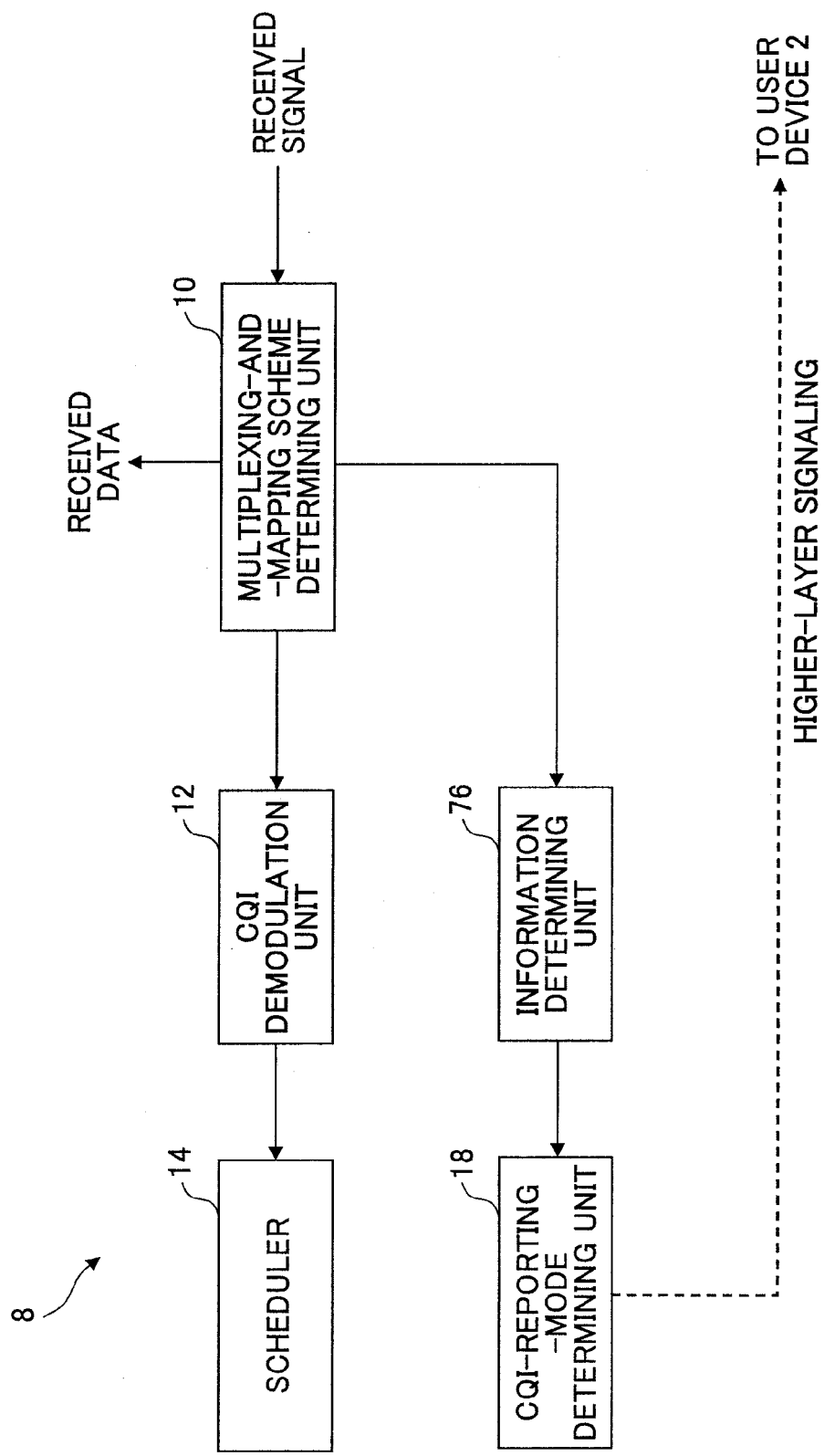
FIG. 8 is a schematic block diagram illustrating a configuration of a base station according to a fourth embodiment of the present invention.

FIG. 8 is a schematic block diagram illustrating a configuration of a base station according to the fourth embodiment of the present invention. As shown in FIG. 8, a base station 8 of the fourth embodiment includes a multiplexing-and-mapping scheme determining unit 10, a CQI demodulation unit 12, a scheduler 14, a CQI-reporting-mode determining unit 18, and an information determining unit 76. The multiplexing-and-mapping scheme determining unit 10, the CQI demodulation unit 12, and the scheduler 14 have substantially the same configurations and functions as described in the first through third embodiments, and overlapping descriptions of those components are omitted here.

The information determining unit 76 may be implemented as a quality requirement information determining unit, a PUCCH multiplexing determining unit, an uplink resource block (RB) usage determining unit, an uplink wideband CQI determining unit, or a combination of them.

The information determining unit 76 implemented as a quality requirement information determining unit (hereafter, may be called a quality requirement information determining unit 76) is described below. The quality requirement information determining unit 76 receives quality requirement information separated from a received signal from the multiplexing-and-mapping scheme determining unit 10 and determines whether a quality requirement indicated by the quality requirement information is less than or equal to a predetermined reference level. The quality requirement may be represented, for example, by a delay, an error rate, a data rate, a degree of urgency of a call, or an agreement between a communication service provider and a user. The quality requirement information determining unit 76 reports the determination result to the CQI-reporting-mode determining unit 18. The quality requirement information determining unit 76 may be configured to obtain ID information of the user device from the multiplexing-and-mapping scheme determining unit 10 and to obtain the quality requirement by referring to a user device information storing unit of the communication system based on the ID information.

Next, the information determining unit 76 implemented as a PUCCH multiplexing determining unit (hereafter, may be called a multiplexing determining unit 76) is described below. The multiplexing determining Unit 76 determines whether the number of user devices (or signals) multiplexed in an uplink PUCCH is less than or equal to a predetermined reference value. The multiplexing determining unit 76 reports the determination result to the CQI-reporting-mode determining unit 18.

The information determining unit 76 implemented as an uplink RB usage determining unit (hereafter, may be called an RB usage determining unit 76) is described below. The RB usage determining unit 76 determines whether the number of uplink resource blocks allocated to user devices in uplink scheduling (i.e., RB usage rate or the ratio of allocated RBs) is less than or equal to X % of the total number of available RBs. The RB usage determining unit 76 reports the determination result to the CQI-reporting-mode determining unit 18.

The information determining unit 76 implemented as an uplink wideband CQI determining unit (hereafter, may be called a CQI determining unit 76) is described below. The CQI determining unit 76 receives, from the multiplexing-and-mapping scheme determining unit 10, a reception quality level(s) of an uplink signal(s) from user devices to which resource blocks are allocated in downlink scheduling. The reception quality level may be represented by, for example, uplink average received signal power S or an average received SINR. The CQI determining unit 76 determines whether the received reception quality level is less than or equal to a reference quality value and reports the determination result to the CQI-reporting-mode determining unit 18.

Based on the determination result(s) reported from the information determining unit 76, the CQI-reporting-mode determining unit 18 determines timing of reporting CQIs from the user device(s) 2 (FIG. 2) and a channel used to report the CQIs.

For example, the CQI-reporting-mode determining unit 18 normally determines a CQI reporting mode such that the user device(s) 2 reports CQIs at regular intervals using the PUCCH preferentially. When receiving a determination result indicating that the quality requirement is greater than the predetermined reference level from the information determining unit (quality requirement information determining unit) 76, the CQI-reporting-mode determining unit 18 determines a CQI reporting mode such that the user device(s) 2 regularly reports CQIs using the PUSCH (instead of the PUCCH). If a determination result received from the information determining unit (quality requirement information determining unit) 76 indicates that the quality requirement is less than or equal to the predetermined reference level, but a determination result received from the information determining unit (multiplexing determining unit) 76 indicates that the number of multiplexed user devices (signals) is greater than the predetermined reference value, the CQI-reporting-mode determining unit 18 determines a CQI reporting mode such that the user device(s) 2 reports CQIs at regular intervals using the PUSCH (instead of the PUCCH). In this case, the information determining unit 76 is implemented as a combination of the quality requirement information determining unit and the multiplexing determining unit.

If the quality requirement is less than or equal to the predetermined reference level and the number of multiplexed user devices is less than or equal to the predetermined reference value, but a determination result received from the information determining unit (RB usage determining unit) 76 indicates that the RB usage rate is less than or equal to X %, the CQI-reporting-mode determining unit 18 determines to request the user device(s) 2 to report CQIs at an irregular timing using the PUSCH. When receiving the request, the user device(s) 2 reports CQIs using a PUSCH that is separate from a periodic PUCCH and a periodic PUSCH (i.e., at an irregular timing).

If the quality requirement is less than or equal to the predetermined reference level and the number of multiplexed user devices is less than or equal to the predetermined reference value, but a determination result received from the information determining unit (CQI determining unit) 76 indicates that the reception quality level is less than or equal to the reference quality value, the CQI-reporting-mode determining unit 18 determines to request the user device(s) 2 to report CQIs using the PUSCH at an irregular timing. When receiving the request, the user device(s) 2 reports CQIs using a PUSCH that is separate from a periodic PUCCH and a periodic PUSCH (i.e., at an irregular timing).

Figure 9:
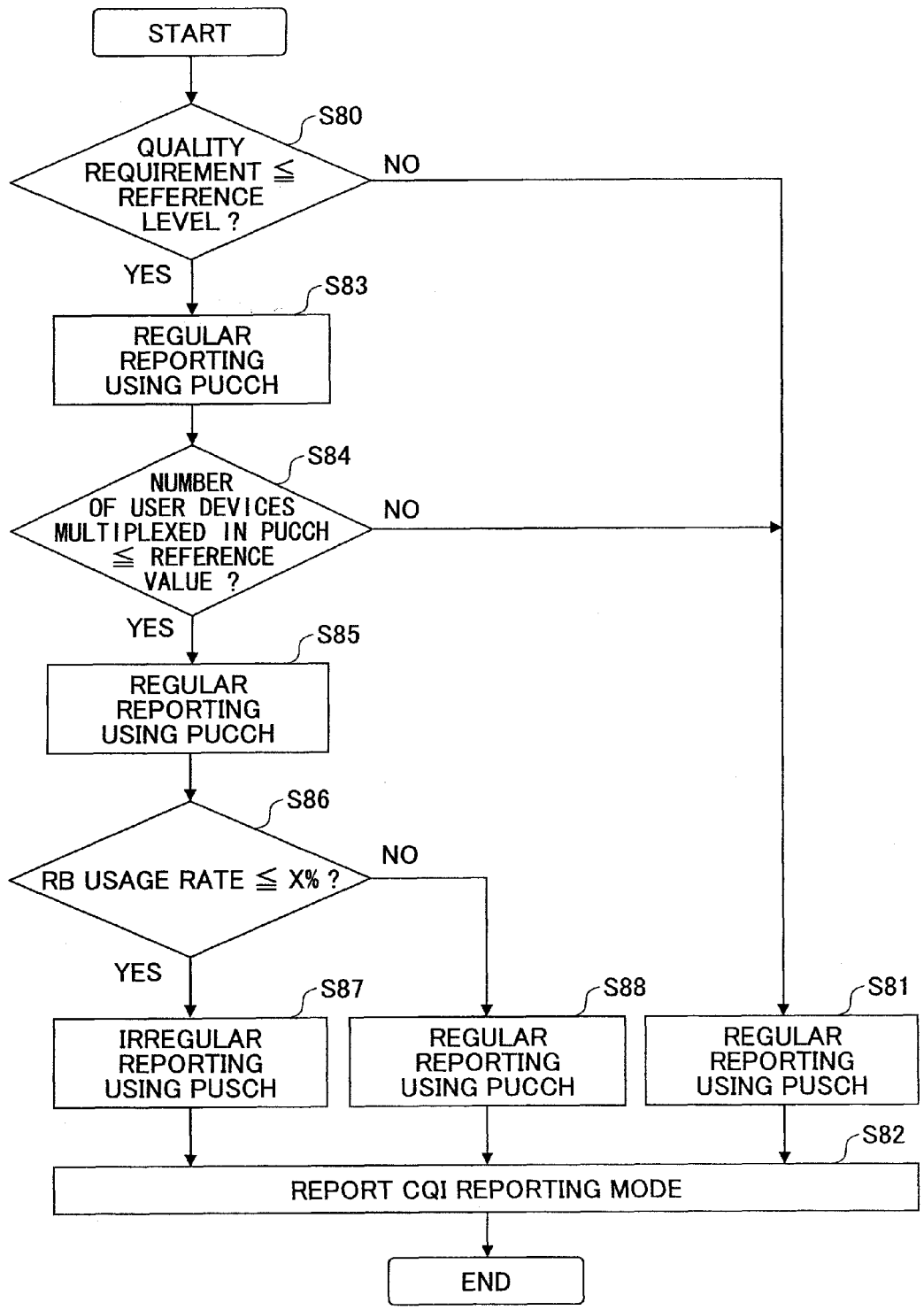
FIG. 9 is a flowchart showing a method of determining a CQI reporting mode according to the fourth embodiment of the present invention.

A method of determining a CQI reporting mode according to the fourth embodiment of the present invention is described below with reference to FIG. 9. In this method, it is assumed that the information determining unit 76 includes the functions of the quality requirement information determining unit, the multiplexing determining unit, and the RB usage determining unit. Also in the descriptions below, it is assumed that the user device 2 of the second embodiment is communicating with the base station 8.

The information determining unit 76 determines whether the quality requirement of the user device 2 (user) is less than or equal to a predetermined reference level (step S80). If the quality requirement is less than or equal to the predetermined reference level (YES in step S80), the CQI-reporting-mode determining unit 18 determines a CQI reporting mode such that the user device(s) 2 reports CQIs at regular intervals using the PUCCH (step S83). If the quality requirement is greater than the predetermined reference level (NO in step S80), the CQI-reporting-mode determining unit 18 determines a CQI reporting mode such that the user device(s) 2 reports CQIs at regular intervals using the PUSCH (step S81), and reports the CQI reporting mode to the user device(s) 2 (step S82). In step S82, the CQI reporting mode is reported, for example, by higher-layer signaling.

If a CQI reporting mode requesting the user device(s) 2 to report CQIs at regular intervals using the PUCCH is determined in step S83, the information determining unit 76 also determines whether the number of user devices to be multiplexed in an uplink PUCCH is less than or equal to a predetermined reference value (step S84). If the number of user devices is less than or equal to the predetermined reference value (YES in step S84), the CQI reporting mode determined in step S83 is maintained (step S85), and the user device(s) 2 reports CQIs at regular intervals using the PUCCH. If the number of user devices is greater than the predetermined reference value (NO in step S84), the CQI-reporting-mode determining unit 18 determines a CQI reporting mode such that the user device(s) 2 reports CQIs at regular intervals using the PUSCH (step S81) and reports the CQI reporting mode to the user device(s) 2 (step S82).

If the CQI reporting mode determined in step S83 is maintained in step S85, the information determining unit 76 further determines whether the uplink RB usage rate is less than or equal to X % (step S86). If the uplink RB usage rate is less than or equal to X % (YES in step S86), the CQI-reporting-mode determining unit 18 determines to request the user device(s) 2 to report CQIs at an irregular timing using the PUSCH (step S87), and transmits the request to the user device(s) 2 (step S82). When receiving the request, the user device(s) 2 reports CQIs at an irregular timing other than regular CQI reporting timings.

If the uplink RB usage rate is greater than X % (NO in step S86), the CQI-reporting-mode determining unit 18 maintains the CQI reporting mode requesting to report CQIs at regular intervals using the PUCCH (step S88), and reports the CQI reporting mode to the user device(s) 2 (step S82).

According to the base station 8, the user device 2, and the method of determining a CQI reporting mode of the fourth embodiment, the base station allows a user device (user) with a high quality requirement to report CQIs at regular intervals using the PUSCH. For example, allowing a user device requesting a large amount of data such as video to report CQIs at regular intervals using the PUSCH makes it possible to stably transmit the large amount of data to the user device. The fourth embodiment also makes it possible to allow even a user device with a relatively low quality requirement to use the PUSCH if the number of multiplexed user devices increases up to the capacity of the PUCCH, and thereby makes it possible to maintain smooth communications. Further with the fourth embodiment, even if a CQI reporting mode requesting a user device(s) to report CQIs at regular intervals using the PUCCH has been determined, it is possible to request the user device(s) to report CQIs at an irregular timing using available resource blocks when the RB usage rate is low. This in turn makes it possible to stably perform communications.

Although the present invention is described above based on various embodiments, the present invention is not limited to the above embodiments and variations and modifications may be made without departing from the scope of the present invention. Although the present invention is described above in different embodiments, the distinctions between the embodiments are not essential for the present invention, and the embodiments may be used individually or in combination.

For example, the second embodiment and the third embodiment may be combined. With the combination of the second and third embodiments, the base station may select, based on both the number of user devices in a cell or a sector and a wideband CQI (uplink average received signal power, average received SINR) of the user device, either a CQI reporting mode requesting to report a wideband CQI and M subband CQIs selected by the user device (or an average of the M subband CQIs) or a CQI reporting mode requesting to report a wideband CQI and subband CQIs specified by the base station.

Assuming that there is an agreement between the base station and the user device to report a wideband CQI and a certain number of subband CQIs regardless of the moving speed of the user device, the base station may select, based on the number of user devices ready to communicate in a cell (or a sector) and/or a wideband CQI (uplink average received signal power S, average received SINR), either a CQI reporting mode requesting to report a wideband CQI and M subband CQIs selected by the user device (or an average of the M subband CQIs) or a CQI reporting mode requesting to report a wideband CQI and subband CQIs specified by the base station. Also, the base station may select a CQI reporting mode requesting only a wideband CQI. In the above case, the user device does not have to include a moving speed measuring unit.

Meanwhile, the base station may be configured to select, based on the moving speed of the user device, one of a CQI reporting mode requesting only a wideband CQI, a CQI reporting mode requesting a wideband CQI and M subband CQIs selected by the user device (or an average of the M subband CQIs (and the corresponding ID information)), or a CQI reporting mode requesting a wideband CQI and subband CQIs specified by the base station.

Further, the base station may be configured to select, based on the number of user devices in a cell (or a sector), one of a CQI reporting mode requesting only a wideband CQI, a CQI reporting mode requesting a wideband CQI and M subband CQIs selected by the user device (or an average of the M subband CQIs (and the corresponding ID information)), or a CQI reporting mode requesting a wideband CQI and subband CQIs specified by the base station.

The method of determining a CQI reporting mode of the fourth embodiment includes a step of determining a quality requirement (step S80), a step of determining the number of multiplexed user devices (step S84), and a step of determining an RB usage rate (step S86). These steps may be performed in any order. For example, the step of determining the number of multiplexed user devices may be performed first. Also, it is not necessary to perform all of the above steps, i.e., only one or two of the steps may be performed.

When a CQI reporting mode requesting the user device to report CQIs at regular intervals using the PUCCH is currently selected (the quality requirement is less than or equal to a reference level and/or the number of multiplexed user devices is less than or equal to a reference value), the base station may determine whether a wideband CQI (uplink average received signal power S, average received SINR) from the user device 2 is less than or equal to a reference quality value (dB). If the wideband CQI is less than or equal to the reference quality value, the base station may allow the user device to report CQIs at an irregular timing using the PUSCH. In other words, step S86 of FIG. 9 may be replaced by a step of determining whether a wideband CQI (uplink average received signal power S, average received SINR) from the user device 2 is less than or equal to a reference quality value (dB) and allowing the user device to report CQIs at an irregular timing using the PUSCH if the wideband CQI is less than or equal to the reference quality value. This method can be performed by the base station 8 of FIG. 8 that additionally includes the reception quality information determining unit 64 of FIG. 6. In this case, for example, the reception quality information determining unit 64 extracts a wideband CQI (preferably, uplink average received signal power S or an average received SINR) from CQIs received from the CQI demodulation unit 12, and outputs the wideband CQI to the CQI-reporting-mode determining unit 18; and the CQI-reporting-mode determining unit 18 determines whether the wideband CQI is less than or equal to a predetermined reference quality value.

In the fourth embodiment, the information determining unit 76 is implemented as a combination of the quality requirement information determining unit, the multiplexing determining unit, and the RB usage determining unit. Alternatively, the information determining unit 76 may be implemented as a combination of the quality requirement information determining unit, the multiplexing determining unit, and the CQI determining unit. In this case, the base station selects either irregular CQI reporting using the PUSCH or regular CQI reporting using the PUCCH based on the wideband CQI instead of the RB usage rate. Also, instead of providing the quality requirement information determining unit, the multiplexing determining unit, and the RB usage determining unit as the information determining unit 76, the quality requirement information determining unit, the multiplexing determining unit, and the RB usage determining unit may be provided separately.

The present international application claims priority from Japanese Patent Application No. 2008-001666 filed on Jan. 8, 2008, the entire contents of which are hereby incorporated herein by reference.

The invention claimed is:

1. A base station for a mobile communication system, the base station comprising:
a detecting unit configured to detect predetermined information regarding a user device; and
a determining unit configured to determine types of channel quality information that need to be reported from the user device to the base station based on the detected information,
wherein the determining unit is configured to select, based on the detected information, one of
a wideband channel quality indicator indicating reception quality of an entire system frequency band allocated to the mobile communication system, and
a combination of the wideband channel quality indicator and one or more channel quality indicators of subbands in the system frequency band as the channel quality information that needs to be reported from the user device to the base station,
wherein, when a combination of a wideband channel quality indicator indicating reception quality of an entire system frequency band allocated to the mobile communication system and one or more channel quality indicators of subbands in the system frequency band is currently selected as the channel quality information that needs to be reported from the user device to the base station,
the detecting unit is configured to detect a number of user devices in a cell or a sector formed by the base station; and the determining unit is configured to select, based on a first reference value for the number of user devices,
  a first combination of the wideband channel quality indicator and highest M channel quality indicators selected by the user device from the channel quality indicators of the subbands or an average of the M channel quality indicators, or
  a second combination of the wideband channel quality indicator and channel quality indicators selected by the base station from the channel quality indicators of the subbands
as the channel quality information that needs to be reported from the user device to the base station.

2. The base station as claimed in claim 1, wherein after selecting the first combination, the determining unit is configured to select, based on a second reference value for the number of user devices, only the wideband channel quality indicator as the channel quality information that needs to be reported from the user device to the base station.

3. The base station as claimed in claim 1, wherein after selecting the first combination, the determining unit is configured to select, based on a second reference value for the extracted wideband channel quality indicator, only the wideband channel quality indicator as the channel quality information that needs to be reported from the user device to the base station.

4. The base station as claimed in claim 1, wherein the determining unit is configured to report the selection result based on the moving speed to the user device by higher-layer signaling as information unique to the user device.

5. The base station as claimed in claim 1, wherein the determining unit is configured to report the selection result based on the first reference value for the number of user devices to the cell or the sector by higher-layer signaling as information unique to the cell or the sector.

6. A user device communicating with the base station of claim 1, the user device comprising:
  a moving speed measuring unit configured to measure the moving speed of the user device.

7. A base station for a mobile communication system, the base station comprising:
  a quality requirement information determining unit configured to obtain a quality requirement of a user device reporting channel quality information at regular intervals using an uplink control channel and to determine whether the obtained quality requirement is less than or equal to a predetermined reference level; and
  a determining unit configured to allow the user device to use an uplink shared channel to report the channel quality information if the quality requirement information determining unit determines that the quality requirement is greater than the predetermined reference level.

8. The base station as claimed in claim 7, further comprising:
  a multiplexing determining unit configured to determine whether a number of multiplexed signals transmitted via the uplink control channel is less than or equal to a predetermined value if the quality requirement information determining unit determines that the quality requirement is less than or equal to the predetermined reference level,
  wherein the determining unit is configured to allow the user device to use the uplink shared channel if the multiplexing determining unit determines that the number of multiplexed signals is greater than the predetermined value.

9. A base station for a mobile communication system, the base station comprising:
  a resource block usage determining unit configured to determine, when resource blocks are allocated by the base station to user devices reporting channel quality information at regular intervals using an uplink control channel, whether a ratio of the allocated resource blocks to all resource blocks available in the mobile communication system is less than or equal to a predetermined reference ratio; and
  a determining unit configured to request the user devices to report the channel quality information using an uplink shared channel if the resource block usage determining unit determines that the ratio is less than or equal to the predetermined reference ratio.

10. A base station for a mobile communication system, the base station comprising:
  a reception quality determining unit configured to determine, when resource blocks are allocated by the base station to user devices reporting channel quality information at regular intervals using an uplink control channel, whether a reception quality level of the uplink control channel is less than or equal to a predetermined reference value; and
  a determining unit configured to request the user devices to report the channel quality information using an uplink shared channel if the reception quality determining unit determines that the reception quality level is less than or equal to the predetermined reference value.

11. A method of determining a mode of reporting channel quality information from a user device to a base station for a mobile communication system, the method comprising the steps of:
  detecting predetermined information regarding the user device; and
  determining types of the channel quality information that need to be reported from the user device to the base station based on the detected information,
  wherein the determining step comprises a step of selecting, based on the detected information, one of
  a wideband channel quality indicator indicating reception quality of an entire system frequency band allocated to the mobile communication system, and
  a combination of the wideband channel quality indicator and one or more channel quality indicators of subbands in the system frequency band as the channel quality information that needs to be reported from the user device to the base station,
  wherein when a combination of a wideband channel quality indicator indicating reception quality of an entire system frequency band allocated to the mobile communication system and one or more channel quality indicators of subbands in the system frequency band is currently selected as the channel quality information that needs to be reported from the user device to the base station,
  in the detecting step, a number of user devices in a cell or a sector formed by the base station is detected; and
  in the determining step,
    a first combination of the wideband channel quality indicator and highest M channel quality indicators selected by the user device from the channel quality indicators of the subbands or an average of the M channel quality indicators, or
    a second combination of the wideband channel quality indicator and channel quality indicators selected by the base station from the channel quality indicators of the subbands is selected, based on a first reference value for the number of user devices, as the channel quality information that needs to be reported from the user device to the base station.

12. The method as claimed in claim 11, further comprising the step of:
after the first combination is selected, selecting, based on a second reference value for the number of user devices, only the wideband channel quality indicator as the channel quality information that needs to be reported from the user device to the base station.

13. The method as claimed in claim 11, further comprising the step of:
after the first combination is selected, selecting, based on a second reference value for the extracted wideband channel quality indicator, only the wideband channel quality indicator as the channel quality information that needs to be reported from the user device to the base station.

14. The method as claimed in claim 11, further comprising the step of:
reporting the selection result based on the moving speed to the user device by higher-layer signaling as information unique to the user device.

15. The method as claimed in claim 11, further comprising the step of:
reporting the selection result based on the first reference value for the number of user devices to the cell or the sector by higher-layer signaling as information unique to the cell or the sector.

16. A method of determining a mode of reporting channel quality information from a user device to a base station for a mobile communication system, the method comprising the steps of:
obtaining a quality requirement of the user device reporting the channel quality information at regular intervals using an uplink control channel and determining whether the obtained quality requirement is less than or equal to a predetermined reference level; and
allowing the user device to use an uplink shared channel to report the channel quality information if the quality requirement is greater than the predetermined reference level.

17. The method as claimed in claim 16, further comprising the steps of:
determining whether a number of multiplexed signals transmitted via the uplink control channel is less than or equal to a predetermined value if the quality requirement is less than or equal to the predetermined reference level; and
allowing the user device to use the uplink shared channel if the number of multiplexed signals is greater than the predetermined value.

18. A method of determining a mode of reporting channel quality information from user devices to a base station for a mobile communication system, the method comprising the steps of:
determining, when resource blocks are allocated by the base station to the user devices reporting the channel quality information at regular intervals using an uplink control channel, whether a ratio of the allocated resource blocks to all resource blocks available in the mobile communication system is less than or equal to a predetermined reference ratio; and
requesting the user devices to report the channel quality information using an uplink shared channel if the ratio is less than or equal to the predetermined reference ratio.

19. A method of determining a mode of reporting channel quality information from user devices to a base station for a mobile communication system, the method comprising the steps of:
determining, when resource blocks are allocated by the base station to the user devices reporting the channel quality information at regular intervals using an uplink control channel, whether a reception quality level of the uplink control channel is less than or equal to a predetermined reference value; and
requesting the user devices to report the channel quality information using an uplink shared channel if the reception quality level is less than or equal to the predetermined reference value.

20. The base station as claimed in claim 1, wherein the determining unit is configured to report the selection result based on the first reference value for the extracted wideband channel quality indicator to the user device by higher-layer signaling as information unique to the user device.

21. The method as claimed in claim 11, further comprising the step of:
reporting the selection result based on the first reference value for the extracted wideband channel quality indicator to the user device by higher-layer signaling as information unique to the user device.

22. A base station for a mobile communication system, the base station comprising:
a detecting unit configured to detect predetermined information regarding a user device; and
a determining unit configured to determine types of channel quality information that need to be reported from the user device to the base station based on the detected information,
wherein the determining unit is configured to select, based on the detected information, one of
a wideband channel quality indicator indicating reception quality of an entire system frequency band allocated to the mobile communication system, and
a combination of the wideband channel quality indicator and one or more channel quality indicators of subbands in the system frequency band as the channel quality information that needs to be reported from the user device to the base station,
wherein, when a combination of a wideband channel quality indicator indicating reception quality of an entire system frequency band allocated to the mobile communication system and one or more channel quality indicators of subbands in the system frequency band is currently selected as the channel quality information that needs to be reported from the user device to the base station,
the detecting unit is configured to extract the wideband channel quality indicator from a signal received from the user device; and
the determining unit is configured to select, based on a first reference value for the extracted wideband channel quality indicator,
a first combination of the wideband channel quality indicator and highest M channel quality indicators selected by the user device from the channel quality indicators of the subbands or an average of the M channel quality indicators, or
a second combination of the wideband channel quality indicator and channel quality indicators selected by the base station from the channel quality indicators of the subbands as the channel quality information that needs to be reported from the user device to the base station.

23. A method of determining a mode of reporting channel quality information from a user device to a base station for a mobile communication system, the method comprising the steps of:
   detecting predetermined information regarding the user device; and
   determining types of the channel quality information that need to be reported from the user device to the base station based on the detected information,
   wherein the determining step comprises a step of selecting, based on the detected information, one of
   a wideband channel quality indicator indicating reception quality of an entire system frequency band allocated to the mobile communication system, and
   a combination of the wideband channel quality indicator and one or more channel quality indicators of subbands in the system frequency band as the channel quality information that needs to be reported from the user device to the base station,
   wherein when a combination of a wideband channel quality indicator indicating reception quality of an entire system frequency band allocated to the mobile communication system and one or more channel quality indicators of subbands in the system frequency band is currently selected as the channel quality information that needs to be reported from the user device to the base station,
   in the detecting step, the wideband channel quality indicator is extracted from a signal received from the user device; and
   in the determining step,
      a first combination of the wideband channel quality indicator and highest M channel quality indicators selected by the user device from the channel quality indicators of the subbands or an average of the M channel quality indicators, or
      a second combination of the wideband channel quality indicator and channel quality indicators selected by the base station from the channel quality indicators of the subbands
      is selected, based on a first reference value for the extracted wideband channel quality indicator, as the channel quality information that needs to be reported from the user device to the base station.

* * * * *